UNITED STATES PATENT OFFICE.

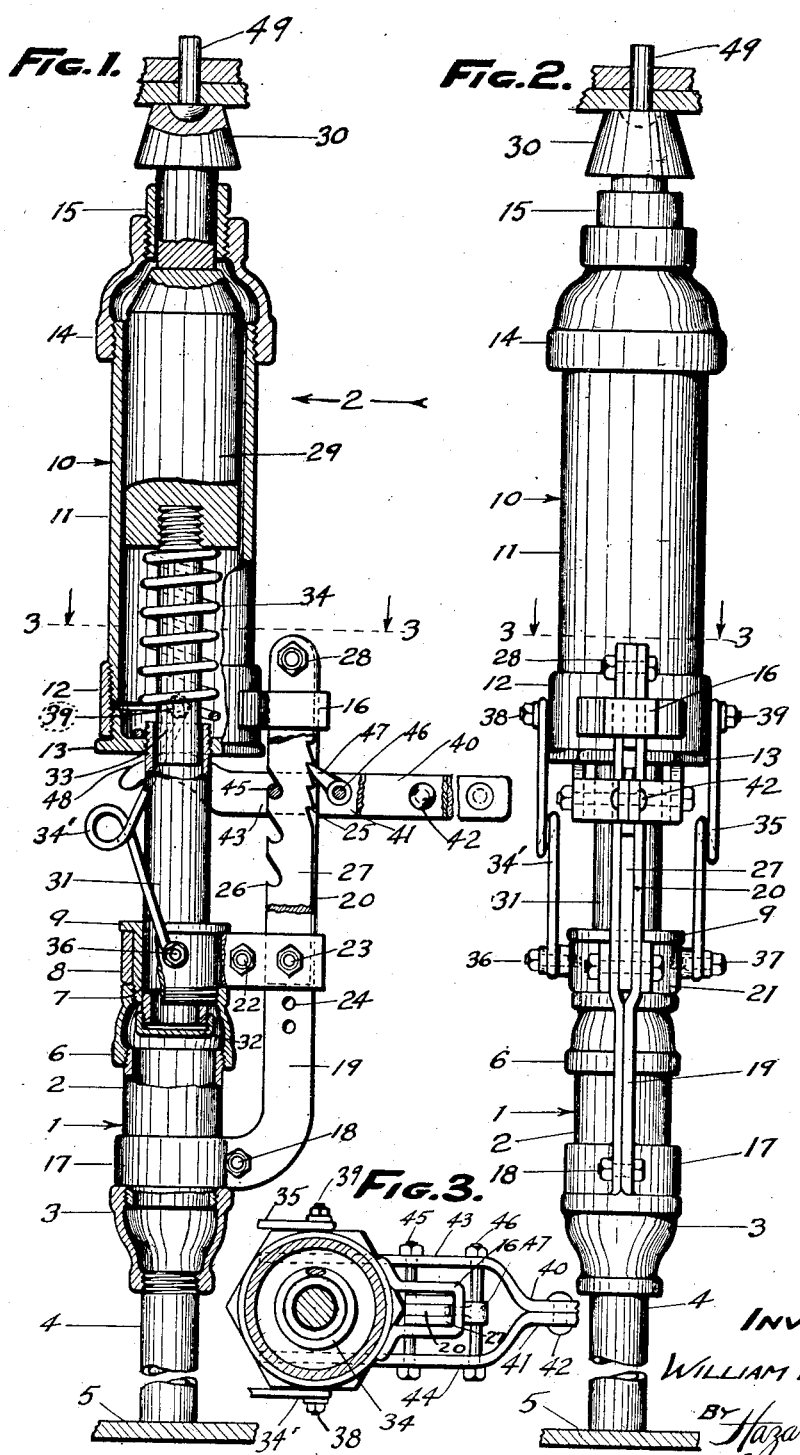

WILLIAM FITZGERALD, OF LONG BEACH, CALIFORNIA.

RIVET HOLDER AND BUCKER-UP.

1,332,620.  Specification of Letters Patent.  Patented Mar. 2, 1920.

Application filed April 22, 1919. Serial No. 291,884.

*To all whom it may concern:*

Be it known that I, WILLIAM FITZGERALD, a citizen of the United States, residing at Long Beach, in the county of Los Angeles and State of California, have invented new and useful Improvements in Rivet Holders and Bucker-Ups, of which the following is a specification.

My object is to make a rivet holder and bucker up and my invention consists of the novel features herein shown, described and claimed.

Figure 1 is a central longitudinal sectional detail of a rivet holder and bucker up embodying the principles of my invention.

Fig. 2 is a side elevation looking in the direction indicated by the arrow 2 in Fig. 1.

Fig. 3 is a cross section on the lines 3—3 of Figs. 1 and 2 and looking in the direction indicated by the arrow.

A base 1 comprises a central pipe section 2, a reducer coupling 3 mounted upon the lower end of the pipe section 2, an interchangeable pipe nipple 4 mounted in the lower end of the coupling 3, and adapted to engage a support 5. A coupling 6 is mounted upon the upper end of the pipe 2, a bushing 7 mounted in the upper end of the coupling 6 and having a long smooth bearing neck 8 and a flange 9. The interchangeable nipples 4 are made of various lengths so that they may be changed to produce the aggregate length desired.

A shock absorbing head 10 comprises a straight cylinder 11, a coupling 12 screwed upon the lower end of the cylinder and a bushing 13 screwed in the lower end of the coupling 12, a reducer coupling 14 screwed upon the upper end of the cylinder 11, a bearing sleeve or bushing 15 screwed in the upper end of the reducer coupling 14, and a U-shaped bearing 16 soldered, brazed or welded to the coupling 12.

A split bearing 17 is placed upon the pipe nipple 2 and clamped in place by a bolt 18. Arms 19 extend outwardly and upwardly from both ends of the bearing 17, the upper ends of the arms 19 being offset outwardly from each other to form a space 20.

A split bearing 21 is placed upon the neck 8 and clamped in place by a bolt 22, and the ends of the strap fitting against the outer faces of the arms 19 and held in place by a removable bolt 23, there being a plurality of bolt holes 24 in the arms 19 for the bolt 23 so that the bearing 17 may be moved up and down to the limits of the pipe nipple 2, by moving the bolt 23 from one hole 24 to another.

Ratchet teeth 25 are formed upon the outer edge of a rack bar 27, said teeth pointing downwardly, and ratchet teeth 26 are formed upon the inner edge of the bar 27, said ratchet teeth 26 pointing upwardly. The rack bar 27 is fitted between the offset portions of the arms 19. The U-shaped bearing 16 fits slidingly upon the upper ends of the arms 19 and a bolt 28 is inserted through the arms and through the spacing block above the bearing 16. A hammer head 29 is slidingly mounted in the cylinder 11, the rivet set holder 30 is slidingly mounted in the sleeve 15 against the upper end of the hammer head 29. The rivet set holders 30 are made interchangeable so that an old one may be taken out and a new one substituted, or so that they may be changed as desired.

A pipe stem 31 is screwed into the lower end of the bushing 13 and extends through the bushing 7. A cap 32 is screwed upon the lower end of the stem 31 to hold the stem from being withdrawn upwardly through the bushing. The pipe cylinder 2 is large enough for the cap 32 to move downwardly. A stem 33 is screwed into the lower end of the hammer head 29 and is slidingly mounted in the pipe stem 31, and an expansive coil spring 34 is placed around the stem 33 between the bottom of the hammer head and the upper face of the bushing 13.

Springs 34' and 35 are connected to the bearing 17 by stud bolts 36 and 37, and to the coupling 12 by stud bolts 38 and 39, the tension of the springs 34' and 35 being exerted to push the shock absorbing head 10 away from the base 1 and to make a yielding connection between the head and the base.

Handle bars 40 and 41 are brought together and secured by rivets 42 to make a handle, and the ends of the bars are bent outwardly and then into parallel positions to make the forks 43 and 44. A bolt 45 is inserted through the forks 43 and 44 in position to engage the ratchet teeth 26 and a bolt 46 is inserted through the forks 43 and 44, and a pawl 47 is mounted upon the bolt 46 in position to engage the ratchet teeth 25.

The extreme ends of the forks 43 and 44 have round upper faces 48 to engage under the bushing 13.

When the rivet holder and bucker up has been properly adjusted to reach from the support 5 to a rivet 49, the handle is manipulated to place the bolt 45 in the proper one of the notches formed by the teeth 26, then the outer end of the lever is depressed to raise the rivet set 30 firmly against the rivet 49, and the pawl 47 will engage the proper one of the teeth 25 and hold the parts in place. The action of heading down the rivet 49 will transmit the force through the rivet set 30 to the hammer head 29, and the hammer head will rebound under each blow upon the rivet by the tension of the spring 34.

Various changes may be made without departing from the spirit of my invention as claimed.

I claim:

1. A rivet holder and bucker-up comprising a base; a shock absorbing head yieldingly connected to the base; a hand lever mounted upon the base and contacting with the shock absorbing head; a hammer head slidingly mounted in the shock absorbing head; a spring behind the hammer head; and a rivet holder extending from the hammer head.

2. A rivet holder and bucker-up comprising a base adapted to engage a backing; a shock absorbing head yieldingly connected to the base; a hammer head slidingly mounted in the shock absorbing head; a spring behind the hammer head; and a rivet holder extending from the hammer head.

3. A rivet holder and bucker-up comprising a central pipe section; a sleeve screwed upon the forward end of the pipe section; a reducer coupling screwed upon the rear end of the pipe section; a pipe nipple screwed in the rear end of the reducer coupling; a bearing sleeve screwed into the forward end of the first sleeve; a bearing bracket upon the bearing sleeve; a lever supporting arm adjustably secured to the bearing bracket and having a bearing bracket slidingly mounted upon the central pipe section; a shock absorbing head having an end slidingly mounted in the bearing sleeve; a spring seat upon the shock absorbing head; a spring upon the shock absorbing head between the spring seat and the bearing sleeve; a hand lever pivotally connected to the lever supporting arm and engaging the spring seat; a hammer head slidingly mounted in the shock absorbing head; a spring behind the hammer head; and a rivet holder extending from the hammer head.

4. A rivet holder and bucker-up comprising a base; a shock absorbing head yieldingly connected to the base; a hand lever mounted upon the base and connected to the shock absorbing head; a hammer head slidingly mounted in the shock absorbing head; a spring behind the hammer head; a rivet holder extending from the hammer head; means for adjusting the position of the lever; and means for holding the outer end of the lever down to hold the inner end in its adjusted position.

5. A rivet holder and bucker-up comprising a base; a shock absorbing head yieldingly connected to the base; a hand lever adjustably mounted to engage the shock absorbing head and press the head upwardly; adjustable means for holding the outer end of the lever down to hold the inner end against the shock absorbing head; and a hammer head slidingly mounted in the shock absorbing head.

In testimony whereof I have signed my name to this specification.

WILLIAM FITZGERALD.